(12) United States Patent
Sallee et al.

(10) Patent No.: US 12,141,238 B2
(45) Date of Patent: Nov. 12, 2024

(54) DEEP NEURAL NETWORK HARDENER

(71) Applicant: Raytheon Company, Tewksbury, MA (US)

(72) Inventors: Philip A. Sallee, South Riding, VA (US); James Mullen, Leesburg, VA (US)

(73) Assignee: Raytheon Company, Tewksbury, MA (US)

( * ) Notice: Subject to any disclaimer, the term of this patent is extended or adjusted under 35 U.S.C. 154(b) by 843 days.

(21) Appl. No.: 17/081,612

(22) Filed: Oct. 27, 2020

(65) Prior Publication Data

US 2022/0129712 A1    Apr. 28, 2022

(51) Int. Cl.

| | |
|---|---|
| *G06N 3/063* | (2023.01) |
| *G06F 18/22* | (2023.01) |
| *G06F 18/2321* | (2023.01) |
| *G06F 18/2415* | (2023.01) |
| *G06N 3/04* | (2023.01) |
| *G06N 3/08* | (2023.01) |

(52) U.S. Cl.
CPC ........ *G06F 18/24155* (2023.01); *G06F 18/22* (2023.01); *G06F 18/2321* (2023.01); *G06N 3/04* (2013.01); *G06N 3/063* (2013.01); *G06N 3/08* (2013.01)

(58) Field of Classification Search
CPC .............. G06F 18/24155; G06F 18/22; G06F 18/2321; G06N 3/04; G06N 3/063; G06N 3/08
See application file for complete search history.

(56) References Cited

U.S. PATENT DOCUMENTS

| | | | |
|---|---|---|---|
| 11,210,537 B2 | 12/2021 | Koivisto et al. | |
| 2018/0018535 A1* | 1/2018 | Li | ............................ G06N 3/04 |
| 2019/0188562 A1* | 6/2019 | Edwards | .................. G06N 3/04 |
| 2019/0258878 A1 | 8/2019 | Koivisto et al. | |
| 2019/0347277 A1* | 11/2019 | Tao | .......................... G06N 3/08 |
| 2020/0104648 A1* | 4/2020 | Yadav | ................. G06F 18/2433 |
| 2021/0264173 A1 | 8/2021 | Wang et al. | |
| 2021/0358626 A1 | 11/2021 | Nicula et al. | |
| 2022/0129706 A1 | 4/2022 | Vivona et al. | |
| 2022/0129758 A1 | 4/2022 | Sallee | |

OTHER PUBLICATIONS

Athalye, Anish, et al., "Synthesizing Robust Adversarial Examples", International Conference on Machine Learning, (2018), 10 pgs.
(Continued)

*Primary Examiner* — Kamran Afshar
*Assistant Examiner* — Brian J Hales
(74) *Attorney, Agent, or Firm* — Schwegman Lundberg & Woessner, P.A.

(57) ABSTRACT

Discussed herein are devices, systems, and methods for classification using a clustering autoencoder. A method can include obtaining content to be classified by the DNN classifier, and operating the DNN classifier to determine a classification of the received content, the DNN classifier including a clustering classification layer that clusters based on a latent feature vector representation of the content, the classification corresponding to one or more clusters that are closest to the latent feature vector providing the classification and a corresponding confidence.

18 Claims, 6 Drawing Sheets

(56) References Cited

OTHER PUBLICATIONS

Carlini, Nicholas, et al., "Defensive Distillation is Not Robust to Adversarial Examples", arXiv:1607.04311v1, (7/1416), 3 pgs.

Evtimov, Ivan, et al., "Robust Physical-World Attacks on Machine Learning Models", arXiv:1707.08945v2 [cs.CR], (Jul. 30, 2017), 10 pgs.

Goodfellow, Ian, et al., "Explaining and Harnessing Adversarial Examples", Published as a conference paper at ICLR. arXiv:1412.6572v3, (Mar. 20, 2015), 11 pgs.

Guo, Chuan, et al., "On Calibration of Modern Neural Networks", arXiv:1706.04599v2 [cs.LG], (Aug. 3, 2017), 14 pgs.

Hein, Matthias, et al., "Why ReLU networks yield high-con?dence predictions far away from the training data and how to mitigate the problem", IEEE Conference on Computer Vision and Pattern Recognition, (2019), 41-50.

Jang, Uyeong, et al., "Objective Metrics and Gradient Descent Algorithms for Adversarial Examples in Machine Learning", ACSAC, (2017), 262-277.

Lee, Kimin, et al., "A Simple Unified Framework for Detecting Out-of-Distribution Samples and Adversarial Attacks", 32nd Conference on Neural Information Processing Systems, (2018), 11 pgs.

Moosavi-Dezfooli, Seyed-Mohsen, et al., "DeepFool: a simple and accurate method to fool deep neural networks", Computer Vision Foundation, (2015), 2574-2582.

Nguyen, Anh, et al., "Deep Neural Networks are Easily Fooled: High Confidence Predictions for Unrecognizable Images", Proceedings of the IEEE Conference on Computer Vision and Pattern Recognition, (2015), 427-436.

Sapre, Suchet, et al., "A Robust Comparison of the KDDCup99 and NSL-KDD IoT Network Intrusion Detection Datasets Through Various Machine Learning Algorithms", arXiv:1912.13204v1, (Dec. 2019), 8 pgs.

Song, Chufeng, et al., "Auto-encoder Based Data Clustering", CIARP, Part I, LNCS 8258, (2013), 117-124.

Van Der Maaten, L., et al., "Visualizing Data Using t-SNE", J. Mach. Learn. Res. 9, (2008), 2579-2605.

Xie, Junyuan, et al., "Unsupervised deep embedding for clustering analysis.", Proceedings of the 33rd International Conference on Machine Learning, (2016), 10 pgs.

"U.S. Appl. No. 17/081,592, Examiner Interview Summary mailed Jan. 24, 2024", 2 pgs.

"U.S. Appl. No. 17/081,592, Non Final Office Action mailed Nov. 8, 2023", 20 pgs.

"U.S. Appl. No. 17/081,592, Response filed Feb. 8, 2024 to Non Final Office Action mailed Nov. 8, 2023", 11 pgs.

"U.S. Appl. No. 17/081,592, Final Office Action mailed Apr. 24, 2024", 19 pgs.

"U.S. Appl. No. 17/081,592, Examiner Interview Summary mailed Jun. 28, 2024", 2 pgs.

"U.S. Appl. No. 17/081,592, Response filed Jul. 2, 2024 to Final Office Action mailed Apr. 24, 2024", 14 pgs.

* cited by examiner

302 RECEIVE, BY AN ENCODER OF A CLUSTERING AUTOENCODER, CONTENT

304 PROVIDE A LATENT FEATURE REPRESENTATION OF THE CONTENT TO A DECODER OF THE AUTOENCODER

306 PROVIDE, BY A CLUSTERING LAYER SITUATED BETWEEN THE ENCODER AND THE DECODER, A PROBABILITY THAT THE CONTENT BELONGS TO A CLASS OF CLASSES REPRESENTED BY RESPECTIVE CLUSTERS IN A LATENT FEATURE REPRESENTATION SPACE BASED ON A DISTANCE BETWEEN THE FEATURE REPRESENTATION AND THE CLUSTER

308 PROVIDE, BY THE DECODER, RECONSTRUCTED CONTENT THAT IS A CONSTRUCTION OF THE CONTENT BASED ON THE LATENT FEATURE REPRESENTATION

504 — OBTAIN CONTENT TO BE CLASSIFIED BY A DNN CLASSIFIER

506 — OPERATE THE DNN CLASSIFIER TO DETERMINE A CLASSIFICATION OF THE RECEIVED CONTENT, THE DNN CLASSIFIER INCLUDING A CLUSTERING CLASSIFICATION LAYER THAT CLUSTERS BASED ON A LATENT FEATURE VECTOR REPRESENTATION OF THE CONTENT, THE CLASSIFICATION CORRESPONDING TO ONE OR MORE CLUSTERS THAT ARE CLOSEST TO THE LATENT FEATURE VECTOR PROVIDING THE CLASSIFICATION AND A CORRESPONDING CONFIDENCE

DEEP NEURAL NETWORK HARDENER

TECHNICAL FIELD

Embodiments discussed herein regard devices, systems, and methods for machine learning and more specifically a cluster encoder or a neural network classifier hardener. Embodiments can help reduce a problem of overconfident class assignments, identify out-of-distribution (OOD) data, identify data drift, or identify malicious content, for example.

BACKGROUND

Traditional deep learning classifiers have an output node for each class, or in the case of a binary decision may have a single output node. If the true class assignments are mutually exclusive, a soft-max function is generally applied across the output nodes. The soft-max function produces real-valued outputs that range between 0 and 1, and sum to 1. The output of the soft-max layer is taken to estimate the probability that a given data instance belongs to each class. The highest estimated probability is taken as the class assignment, often called a "classification". The output of the soft-max layer can also be used to determine confidence in the class assignment. A high probability output for a particular class corresponds to high confidence, as it dictates relatively lower probability for non-maximally predicted classes, and therefore low class confusion. Lower probability of the maximally predicted class indicates high class confusion and corresponds to a low confidence assignment.

DETAILED DESCRIPTION

The traditional deep learning paradigm discussed in the Background is not well suited to properly estimate model uncertainty for potential outliers or anomalies, concept drift, or adversarial attacks. These models are often overconfident, reporting average confidence values that far exceed the expected accuracy of the corresponding ML model (e.g., neural network (NN)). Deep neural networks (DNNs), including classifying networks, learn feature descriptors and decision boundaries that, although often effective at providing class separation, are ill-suited to determine when the computed feature values are outside a normal range. Data outside the training distribution is not guaranteed to produce uniform probability estimates across the possible output values. Such uniform probability estimates reduce the confidence of the output and properly indicate class confusion. Instead, data outside the training distribution often leads to highly-confident predictions for an incorrectly predicted class. Additionally, deep learning models are prone to overfitting to the training data, and only learn features that help to discriminate data in the training set. Other descriptive features of the data that may be useful for distinguishing in-distribution from out-of-distribution data samples are ignored by the deep learning model. This is at least partially because the training paradigm provides no value in learning or retaining these features.

Embodiments, sometimes referred to as a clustering autoencoder, provide a new paradigm for supervised learning using DNN classifiers. Embodiments can address one or more of the previously mentioned challenges of the traditional machine learning paradigm. Embodiments can use a generative autoencoder model to learn a feature representation.

The manner in which the feature representation is learned can encourage learning of all data features that are useful for reconstructing the data. Further, the manner in which the feature representation is learned can provide a representation that clusters the data according to the class assignments, such as to provide improved detection of outliers (e.g., samples that would include over-confident classifications using the traditional machine learning paradigm).

The clustering classifier can provide a visual clarification that the clustering autoencoder is learning pertinent features. If the clustering autoencoder fails to learn a feature, it will be visible in the reconstruction provided by the decoder of the clustering autoencoder. For example, a classifier could indicate that an object is a banana based on only color and not shape, and that would be evident in the output of the decoder. Through training, the clustering autoencoder can be forced to learn the pertinent features, such as shape and color in the example of the banana.

In general, embodiments provide a supervised NN classifier that replaces a traditional input/output NN model that uses, for example a soft-max function for classification. The clustering autoencoder can cluster an input in a latent feature space that is learned. A latent feature vector of the input can be the basis of the clustering. Classes using the clustering autoencoder are clusters in the learned latent feature representation space, rather than soft-max output probabilities used in traditional output nodes. The probability of being in a class can be determined based on a distance from a central value that represents the class, such as a latent feature representation of a centroid or other central point of the cluster.

The latent space learned by the encoder of the clustering autoencoder can increase (e.g., maximize) class separation. The decoder of the clustering autoencoder can regularize the NN to help reduce overfitting to limited training sets. The decoder can enable sampling and verification of examples from each class. This is because the decoder is reconstructing the input provided to the encoder of the clustering autoencoder and the reconstruction of the sample can be compared to the input.

After training, a mixture of Gaussian distributions can be fit to the data in the latent space. The mixture of Gaussian distributions can then be sampled to provide additional samples of a given class. The samples can be used for training or verification, for example.

Embodiments provide a means for separating classes using a clustering autoencoder trained in a supervised fashion. This is distinct from autoencoders that are used in an unsupervised fashion.

Figure 1:
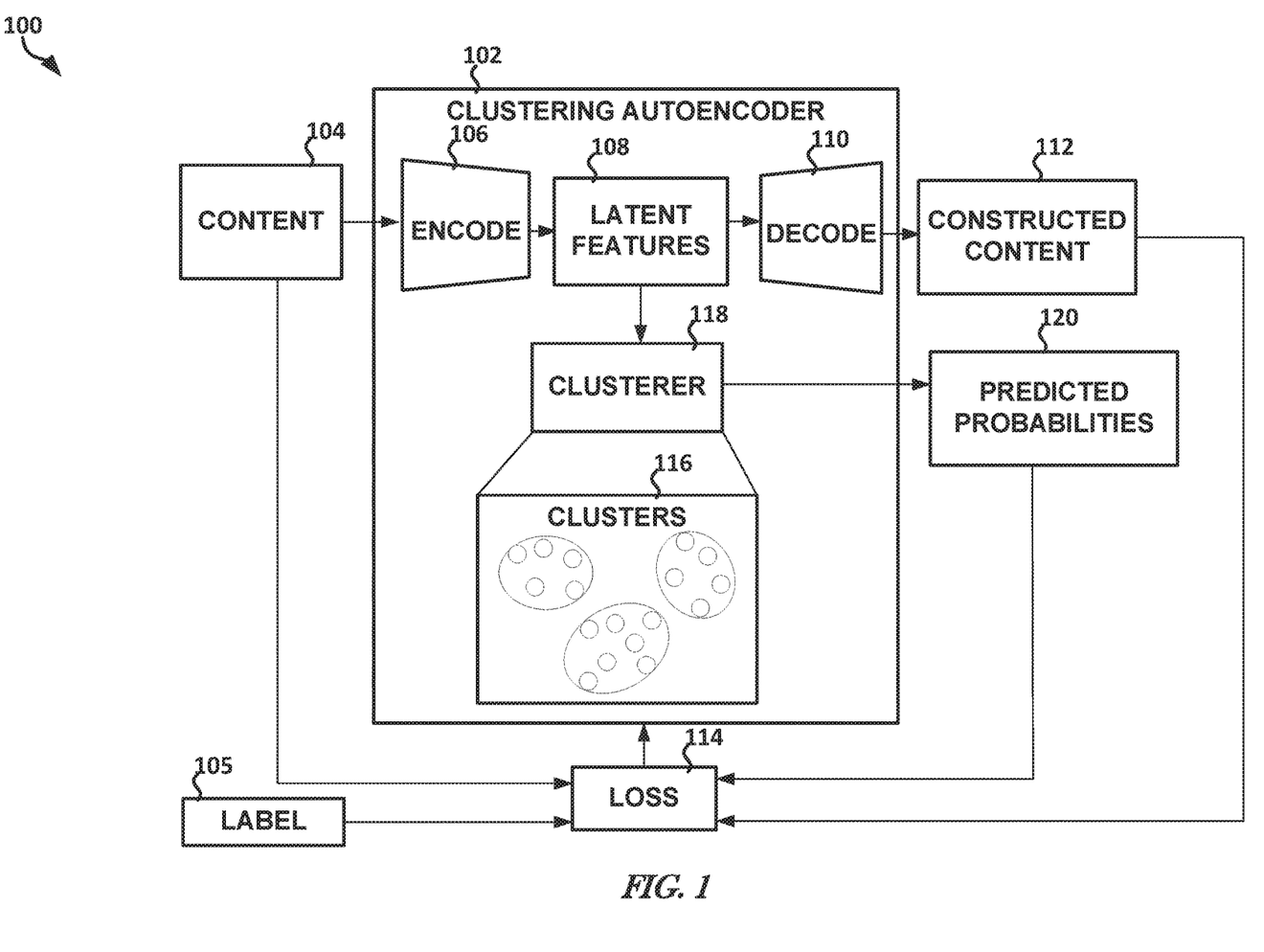
FIG. 1 illustrates, by way of example, a diagram of an embodiment of a clustering autoencoder system.

FIG. 1 illustrates, by way of example, a diagram of an embodiment of a clustering autoencoder system 100. The system 100, as illustrated, includes a clustering autoencoder 102, content 104, a label 105 indicating a classification of the content 104, and reconstructed content 112.

The content 104 can include an image (e.g., a color, black and white, infrared, nighttime, a video frame, or the like), a point set (e.g., a 2D or 3D point set) with or without intensity data, a document (e.g., a portable data format (pdf), text, word, or the like), network traffic data (e.g., control plane or data plane packets or the like), or other data. The label 105 indicates a classification of the content 104

An autoencoder, such as the autoencoder 102, learns to copy its input to its output. An autoencoder has an internal layer (a hidden layer) that describes a "code" (sometimes called a "latent feature vector" or "latent feature representation" herein) used to represent the input. The autoencoder 102 includes an encoder 106 that maps the content 104 into the latent feature vector 108. The autoencoder 102 includes a decoder 110 that maps the latent feature vector 108 to a reconstruction of the content 104. The reconstruction of the content 104 is illustrated as reconstructed content 112 in FIG. 1.

The latent feature vector 108 can be provided to a clustering classification layer, illustrated as the clusterer 118 in FIG. 1. The clusterer 118 can determine a cluster (if any) of the clusters 116 to which the content 104 belongs. The clusterer 118 determines a distance between the latent feature vector 108 of the content 104 and latent features vectors of one or more points (e.g., a central value, such as a latent feature vector of a centroid) of the clusters 116. The distance can be converted to a predicted probability 120 that indicates how likely it is that the content 104 belongs to the cluster. The clusterer 118 in some embodiments can include a fully connected NN layer.

The number of output dimensions of the encoder 106 can be specified as a hyper-parameter design choice. The autoencoder 106 designer can decide how many latent features are included in the latent feature vector 108 by the encoder 106.

The decoder 110 can construct content 112 based on the latent feature vector 108. A difference between the content 104 input into the encoder 106 and the reconstructed content 112 produced by the decoder 110 can be determined based on a cost function known as the loss 114. Additionally, a difference between the label 105 and the predicted probability 120 from the clusterer can be determined based on the loss 114. The cost determined by the loss 114 can be fed back to the clustering autoencoder 102. The loss 114 can be backpropagated through the clustering autoencoder 102, such as for training the clustering autoencoder 102. During runtime, the decoder 110 and the loss 114 are not used.

More formally, the clustering autoencoder 102 includes an encoder 106 network, E, that transforms each input data vector, x, (representing the content 104) into a latent vector 108, z. The decoder 110, D, transforms the latent vector 108, z, back into the data space of x. The decoder 110, D, further provides cluster parameters that describe the probability of class membership for each class based on the latent feature vector 108, z.

The clustering autoencoder 102 has model parameters that include network weights for both the encoder 106, E, and decoder 110, D, and parameters that define the clusters 116.

Parameter adjustment is determined by reducing a loss function, $\mathcal{L}$ The loss function, $\mathcal{L}$ can include a term that measures the error between the data vector, x, and the reconstructed data 112, $\hat{x}:=D(E(x))$. The loss function, $\mathcal{L}$, can include a term that measures the error between the labels (y), a vector assigning x to a set C of N classes, and the vector of cluster probabilities ŷ determined by the clusterer 118, where $\hat{y}_i:=P(x \in C_i)$ for $i \in \{1, \ldots, N\}$. Label assignments can be either exclusive or non-exclusive, and may be either 0, 1, or a real value between 0 and 1, sometimes representing a probability.

One embodiment of the loss function 114, $\mathcal{L}$, can include the following loss function with two terms. One term can include an L2 norm between the content 104 and its reconstruction 112 and another term can include the KL-divergence ($D_{KL}$) between the labels y and the predicted probabilities ŷ:

$$\mathcal{L} = \|x - \hat{x}\|^2 + \lambda D_{KL}(y\|\hat{y})$$

A hyper-parameter λ provides the relative weighting factor between the L2 term and the KL-divergence term.

Alternative to the L2 norm the reconstruction loss can include a mean square error (MSE), a root MSE (RMSE), mean absolute error (MAE), R squared (e.g., 1-MSE (model)/MSE(baseline)) or adjusted R squared, mean square percentage error (MSPE), mean absolute percentage error (MAPE), root mean squared logarithmic error (RMSLE), or the like between the content 104 and the reconstructed content 114.

One embodiment approximates class probabilities using a Student's t-Distribution. Embodiments can estimate vector means, a cluster centroid, for each class i as a vector $\mu_i$ of the same dimension as the latent vector z. The class probability, for each class $C_i$, can thus be determined as in Equation 1:

$$\hat{y}_i := P(x \in C_i) \propto \left(1 + \left\|\frac{z - \mu_i}{\sigma_i}\right\|^2\right)^{-1} \quad \text{Equation 1}$$

A scale parameter, $\sigma_i$, is a vector of the same length as $\mu_i$ that scales the distance between z and $\mu_i$ for each class. Variations of this probability are possible. For example, one variation is realized by assuming a single scale value (a value σ) rather than scaling in each dimension of z. The parameters of this clustering model (here $\mu_i$ and $\sigma_i$), are learned during the training process. The parameters can be learned to reduce the loss function, $\mathcal{L}$. This encourages the encoder 106, E, to learn a transforming function of x which separates the labeled clusters in the training data. A mixture of Gaussian distributions (MOG) may be used in place of the Student's t-Distribution, such as for clustering.

In practice, a cross-entropy loss term can be used in place of $D_{KL}(y\|\hat{y})$. The minimization of the KL-divergence and minimization of the cross-entropy are equivalent as long as the entropy of the assigned class labels is not affected by the minimization. Other loss terms that enforce similarity between the assigned class labels and the modeled class probabilities may be used. Equivalence between KL-Divergence $D_{KL}(y\|\hat{y})$ and Cross-Entropy $H(y,\hat{y})$ is given by the relationship between them:

$$H(\hat{y},y) = D_{KL}(y\|\hat{y}) + H(y) = -\Sigma_i y_i \log(\hat{y}_i)$$

Since the entropy of the true labels $H(y) = -\Sigma_i y_i \log(y_i)$ is a constant, minimizing one necessarily minimizes the other.

For cluster models that permit sampling, a sample may be drawn from a cluster and visualized by transforming the sample by the decoder 110, D. Direct sampling from the Student's t-Distribution is not straight forward. After training with the Student's t-Distribution, a MOG distribution can be fit to the clusters 116 for the training data. The samples can then be sampled from the MOG instead of the Student's t-Distribution. Note that this can be done after training the model.

Tables 1 and 2 provide confidence (the model probability for the predicted class assignment) when correct and incorrect and accuracy for a convolutional neural network (CNN) model and confidence when correct and incorrect and accuracy for a clustering autoencoder operating with data that has been attacked in a variety of ways, respectively.

TABLE 1 confidence when correct and incorrect and accuracy for a convolutional neural network (CNN) model trained with 10% uniform independent and identically distributed (i.i.d.) additive noise and operating with data that has been attacked in a variety of ways.

| | BASELINE | | |
| --- | --- | --- | --- |
| ATTACK | ACCURACY | MEAN CONFIDENCE (CORRECT) | MEAN CONFIDENCE (INCORRECT) |
| NONE | 99.04% | 1.00 | 0.91 |
| FastGradientSign | 90.24% | 0.99 | 0.94 |
| DeepFool | 94.09% | 0.99 | 0.92 |
| NewtonFool | 98.97% | 1.00 | 0.82 |
| L_Infinity | 98.59% | 1.00 | 0.86 |

TABLE 2 confidence when correct and incorrect and accuracy for a clustering autoencoder operating with data that has been attacked in a variety of ways.

| | CLUSTERING AUTOENCODER | | |
| --- | --- | --- | --- |
| ATTACK | ACCURACY | MEAN CONFIDENCE (CORRECT) | MEAN CONFIDENCE (INCORRECT) |
| NONE | 99.20% | 0.98 | 0.65 |
| FastGradientSign | 94.18% | 0.99 | 0.65 |
| DeepFool | 98.89% | 0.96 | 0.62 |
| NewtonFool | 99.19% | 0.98 | 0.63 |
| L_Infinity | 99.11% | 0.96 | 0.53 |

As can be seen in comparing Tables 1 and 2, the clustering autoencoder of embodiments provides a much lower confidence in its classification when it is incorrect. This is because of the manner in which the probability and confidence are determined by the clustering autoencoder 102, more specifically the clusterer 118.

Consider a scenario in which the content 104 includes network packets or other communications between devices. The clustering autoencoder 102 can be trained to detect an attack. The attack can be detected by determining the content 104 is part of a cluster 116 that corresponds to the attack, or the attack can be detected by determining the content 104 is not part of any of the clusters 116. Note that one or more of the clusters 116 can represent normal traffic (communications between devices). The probability that the communication is normal (part of a normal traffic cluster) can be determined. If the normal complement (1 minus the probability that the communication is normal) is greater than a threshold (e.g., 0.3, 0.4, 0.5, 0.6, 0.7, 0.8, 0.9, 0.95, a greater or lesser number or a number therebetween), than the communication may correspond to an attack, but in any case is considered not normal. In equation form, the normal complement is 1−P (normal). The normal complement can be normalized, such as by dividing the probability of normal by a sum of the probability of being in an attack cluster and subtracting from one (1). In equation form, this is 1−P (normal)/$\Sigma_i P(C_i)$. The normalized complement can be combined with a mean square error (MSE) of reconstruction to determine whether the content 104 is likely part of an attack cluster or is an outlier. In equation form, this is $$1 - \frac{P(\text{normal})}{\sum_i P(C_i)} 1/\left(1 + \max(0, \|x - \hat{x}\|^2 - \tau)\right).$$

Where x is the content 104, $\hat{x}$ is the reconstructed content 112, and $\tau$ is a tunable parameter that adjusts the rate of outlier determination. For example, $\tau$ can be set such that 99%, or other percent, of the content 104 has a reconstruction error less than delta. If the complement plus MSE is greater than a threshold, than the content 104 can be considered an outlier and a potential attack. If the complement plus MSE is less than the threshold and the probability complement of normal is greater than the threshold, than content 104 can be considered to be part of an attack cluster.

The neuron configuration of the encoder 106 and decoder 110 is variable and dependent on the application. In some embodiments, the encoder 106 and decoder 110 can have similar structure. The encoder 106 and decoder 110 can include a number of densely connected layers, such as greater than one. The neurons can include a hyperbolic tangent activation function (tanh( )) or other activation function. The number of latent features in the latent feature vector 108 is also variable and can include greater than one latent feature.

Figure 2:
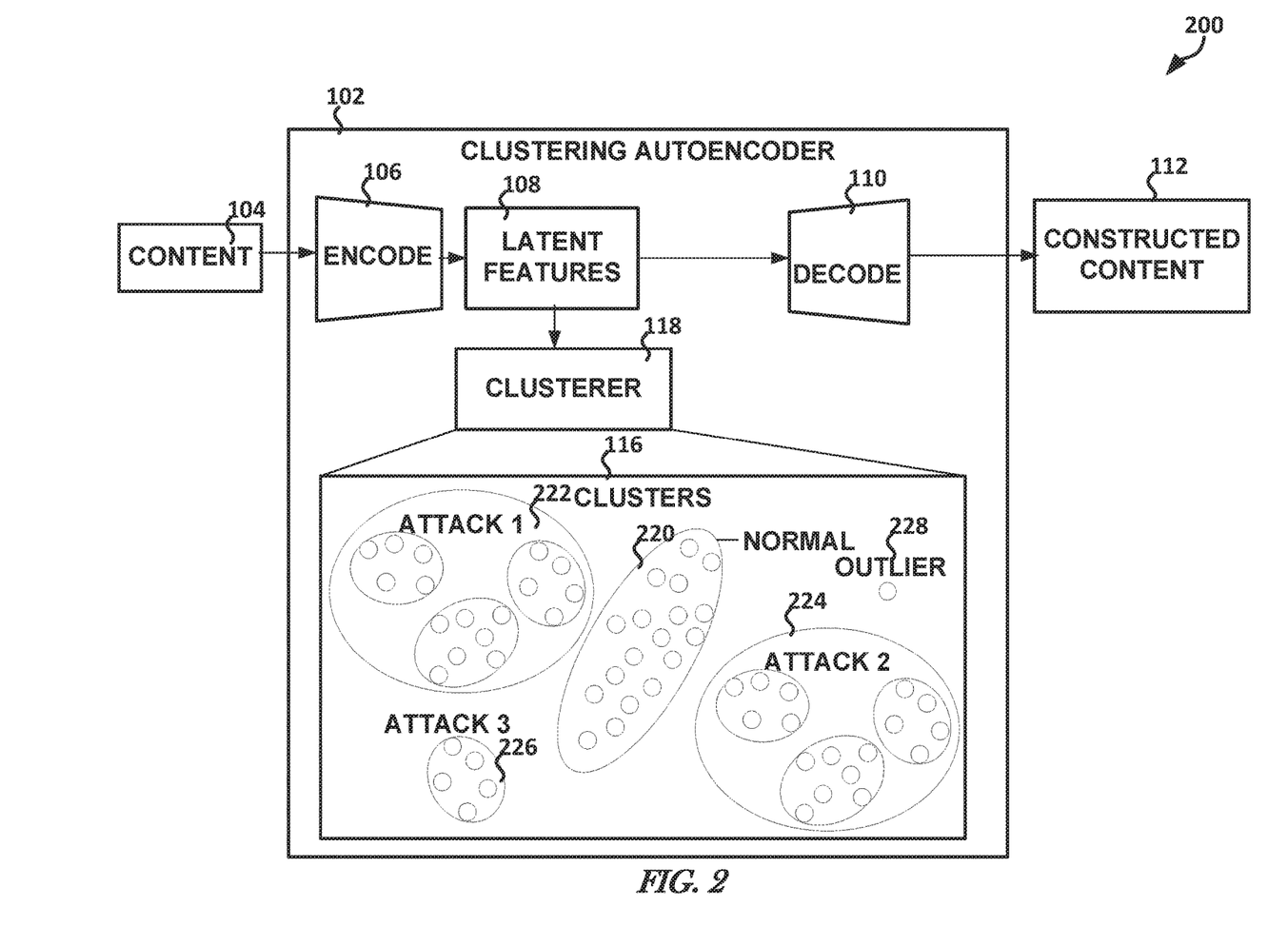
FIG. 2 illustrates, by way of example, a diagram of an embodiment of a clustering autoencoder to identify content corresponding to an attack.

FIG. 2 illustrates, by way of example, a diagram of an embodiment of a clustering autoencoder 200 to identify content corresponding to an attack. The clustering autoencoder 200 is similar to the clustering autoencoder 100 with the classes (clusters 116) of the clustering autoencoder 200 learned for attack detection. The clusters 116 include a normal traffic cluster 220, a variety of attack clusters 222, 224, 226, and an outlier 228. Content 104 with a latent feature vector 108 that lies within the cluster 220 can be deemed normal traffic. Content 104 with a latent feature vector 108 that lies within one of the clusters 222, 224, 226 can be deemed an attack. The clusters 222, 224 each include sub-clusters. That is, the clusters 222, 224 represent a family of attacks and the sub-clusters represent respective specific attacks within that family. The outlier 228 is determined, such as by using a process described elsewhere herein, to not be a part of any of the normal cluster 220 or attack clusters 222, 224, 226. The outlier 228 can be a part of a new cluster.

Figure 3:
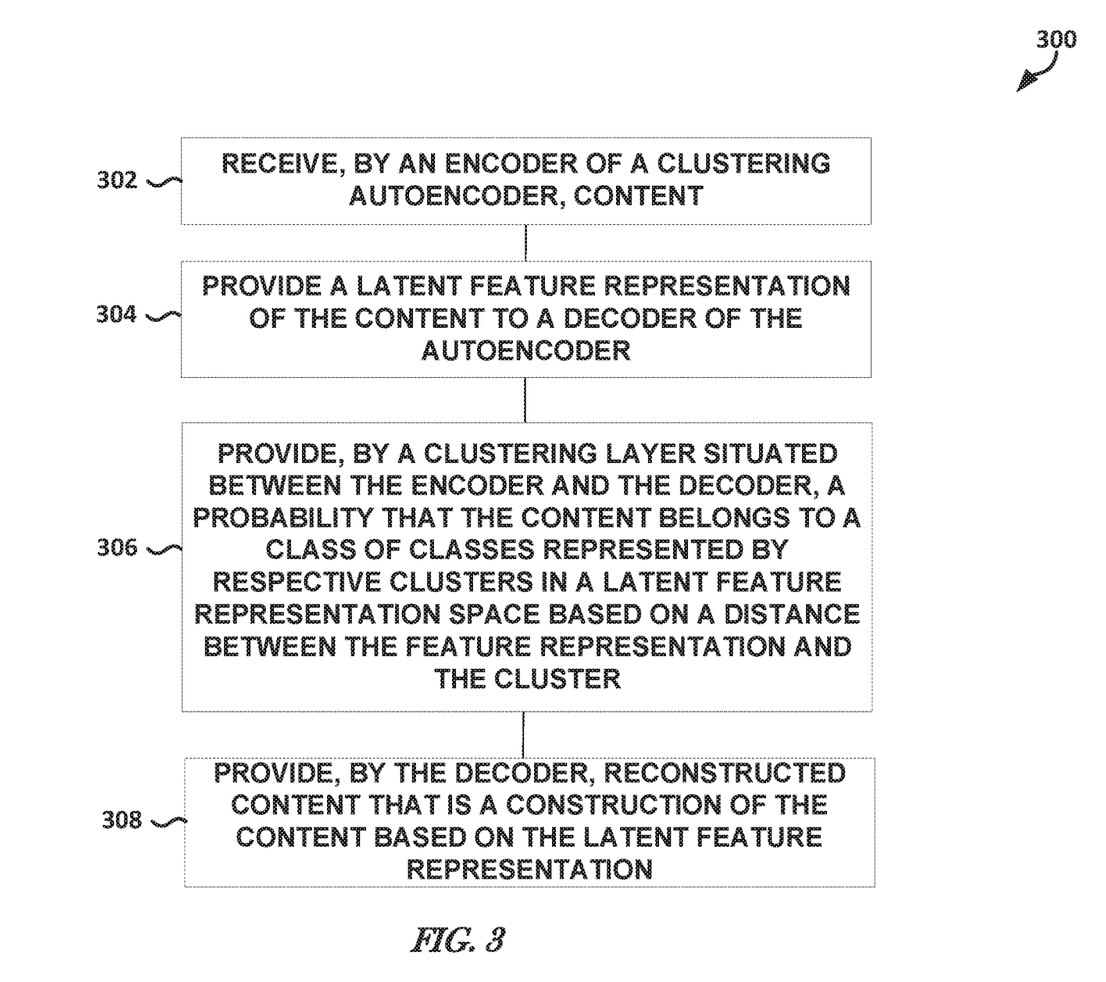
FIG. 3 illustrates, by way of example, a diagram of an embodiment of a method for classification using a clustering autoencoder.

FIG. 3 illustrates, by way of example, a diagram of an embodiment of a method 300 for classification using a clustering autoencoder, such as the autoencoder 100, 200. The method 300 includes a computer-implemented method for content classification using supervised machine learning (ML). The method 300 as illustrated includes receiving, by an encoder of an autoencoder, content, the autoencoder trained using other content and corresponding labels, at operation 302 providing, by the encoder, a latent feature representation of the content to a decoder of the autoencoder, at operation 304; and providing, by a clustering layer situated between the encoder and the decoder, a probability that the content belongs to a class of classes represented by respective clusters in a latent feature representation space based on a distance between the feature representation and the cluster, at operation 306; and providing, by the decoder, reconstructed content that is a construction of the content based on the latent feature representation, at operation 308.

The method 300 can further include, wherein the autoencoder is trained to reduce a difference between the content and the reconstructed content and increase a similarity between the labels and the predicted class probabilities. The method 300 can further include, wherein the autoencoder is trained based on an L2 norm and a cross-entropy. The method 300 can further include, wherein the probability that the content belongs to the class is determined using a Student's t-Distribution or a mixture of Gaussian distributions.

The method 300 can further include sampling a latent feature representation from a cluster of the clusters to determine another member of the class. The method 300 can further include, wherein the probability that the content belongs to the class is determined using a Student's t-Distribution, fitting a mixture of Gaussian distributions to the Student's t-Distribution, and sampling a latent feature representation from a cluster of the clusters using the mixture of Gaussian distributions to determine another member of the class. The method 300 can further include determining a reconstruction error based on the reconstructed and the content, and determining the content is not a member of the class in response to determining the reconstruction error is greater than a threshold.

The method 300 can further include, wherein the content is computer-transmissible content and the classes include respective malicious classes. The method 300 can further include determining a normalized probability complement plus the reconstruction error to determine the probability that the latent feature vector is a member of the class. The method 300 can further include determining the content is an outlier in response to the distance between the latent feature representation of the content being more than a threshold distance away from a central point of each of the clusters.

The clustering autoencoder 100, 200 can operate as a standalone NN. A portion of the autoencoder 100, 200 can, however, be used to improve performance of another deep NN (DNN). One or more of the advantages of the clustering autoencoder 100, 200 can be realized by using the clusterer 118 in place of a classification layer of a trained DNN.

As previously discussed, DNNs can be highly accurate for many detection and classification tasks, but DNNs are notoriously bad at estimating confidence for their predictions. DNNs have been shown to be easily "fooled" (Nguyen, et al. "Deep neural networks are easily fooled: High confidence predictions for unrecognizable images", 2015). A DNN can be said to be "fooled" when its confidence is high, but its prediction is wrong.

Humans intuitively understand when they are looking at something novel and can generally indicate when they are uncertain. In contrast, DNN classifiers have no such sense. DNNs are notoriously over-confident in predictions even when a given exemplar does not belong to any of the classes the network is trained to recognize. Table 1 illustrates this point well.

For some applications, understanding when to trust and when not to trust an ML model can be more important than prediction accuracy. That is, sometimes it is important for a model to know when it is analyzing something it does not know. Detecting when a data sample does not belong to the training distribution can be important to determine whether the network prediction can be expected to be reliable, detect anomalies or outliers, or identify data drift. This can be important in a continuous application of ML models, in which the performance of ML models can significantly degrade over time due to a variety of unpredictable factors in a changing world. It can also be important to address the potential threat of adversarial attacks, in which data may be manipulated by an adversary to intentionally fool the ML network. For at least the foregoing reasons, it is advantageous to take an existing network that has already been trained and make it more robust to data drift, adversarial attack and outliers, or provide more accurate confidence estimates for its predictions.

As previously discussed, previous DNN classifiers are trained with an output node for each class label, typically with a soft-max function to scale the predicted outputs to approximate probabilities. A number of recent works have shown that deep networks are generally overconfident, and the probabilities assigned are not good indicators of the expected accuracy. One approach to curb the overconfidence is by calibrating the model, such as by using temperature scaling which computes a multiplicative scaling factor to post-process the network outputs. This calibration does not address the general problem of "fooling" however, which occurs when even the most confident predictions are wrong. Some works have provided networks with a "reject" option, which allows them to reject some samples to focus on training on a subset the model can learn to predict well, but this approach can cause networks to ignore the more challenging classification cases.

Supervised methods have focused on a direct approach, in which class predictions are a forced choice (e.g., argmax) of the network output. This approach is prone to selecting, with high confidence, one of the classes simply because the others are a worse fit to the data, regardless of whether the class chosen is a good fit or not. One simple and common approach to address overconfidence is to simply add an "unknown" or "background" class. However, this only results in learning features for whatever background samples are provided for training, requiring all potential non-target variations to be included in the training.

To the knowledge of the inventors, there is no solution that successfully addresses the fundamental aspects of this problem, which addresses the fact that NNs learn decision boundaries, rather than distributions. This is at least because the traditional approach fails to learn decision boundaries for any anomalies not present in the training set. Other works have applied a statistical distribution to the output of the network, but none have made this distribution a trainable layer in a supervised deep learning model as is employed in embodiments.

Embodiments can take an existing trained network and add a clustering layer containing a latent feature space that is tuned to provide improved confidence estimates. The clustering layer "hardens" a given network against out-of-distribution (OOD) data samples and adversarial attacks. Class labels are associated with clusters in the latent feature space of the DNN.

Some embodiments can use a Student's t-Distribution to determine probabilities (and confidences) as previously discussed. Confidence in a class label is determined for a data sample by how closely it falls within one of the class distributions (e.g., clusters) as measured by a distance function (e.g., Euclidean distance, cosine distance, or the like) from a centroid for each class. The clustering layer can be trained using a learning rule that increases confidence for correct class predictions and decreases confidence for incorrect class predictions by increasing a cross-entropy, KL divergence, or the like between the confidence scores and the class labels.

A DNN that is trained with the proposed method can indicate when it is analyzing something it does not know. This is because samples that fall outside the modeled clusters are assigned low confidence and can be used to identify OOD samples or data drift.

An interesting aspect of embodiments is the use of supervised learning with classes assigned to clusters in the latent feature representation space on a pretrained DNN. For learning at the clustering classification layer, a confidence loss can be used where the parameters of the clusters are learned based on a cross-entropy loss to match one-hot encoded (or other encoding of the) class labels. Additionally, or alternatively, embodiments can provide the use of clustering with semi-supervised learning to identify unknown classes. Additionally, or alternatively, embodiments can provide the ability to quantitatively track data drift using distance metrics in the latent space. Additionally, or alternatively, embodiments can provide the ability to train an existing network to detect additional classes or sub-classes without changing the network architecture.

Figure 4:
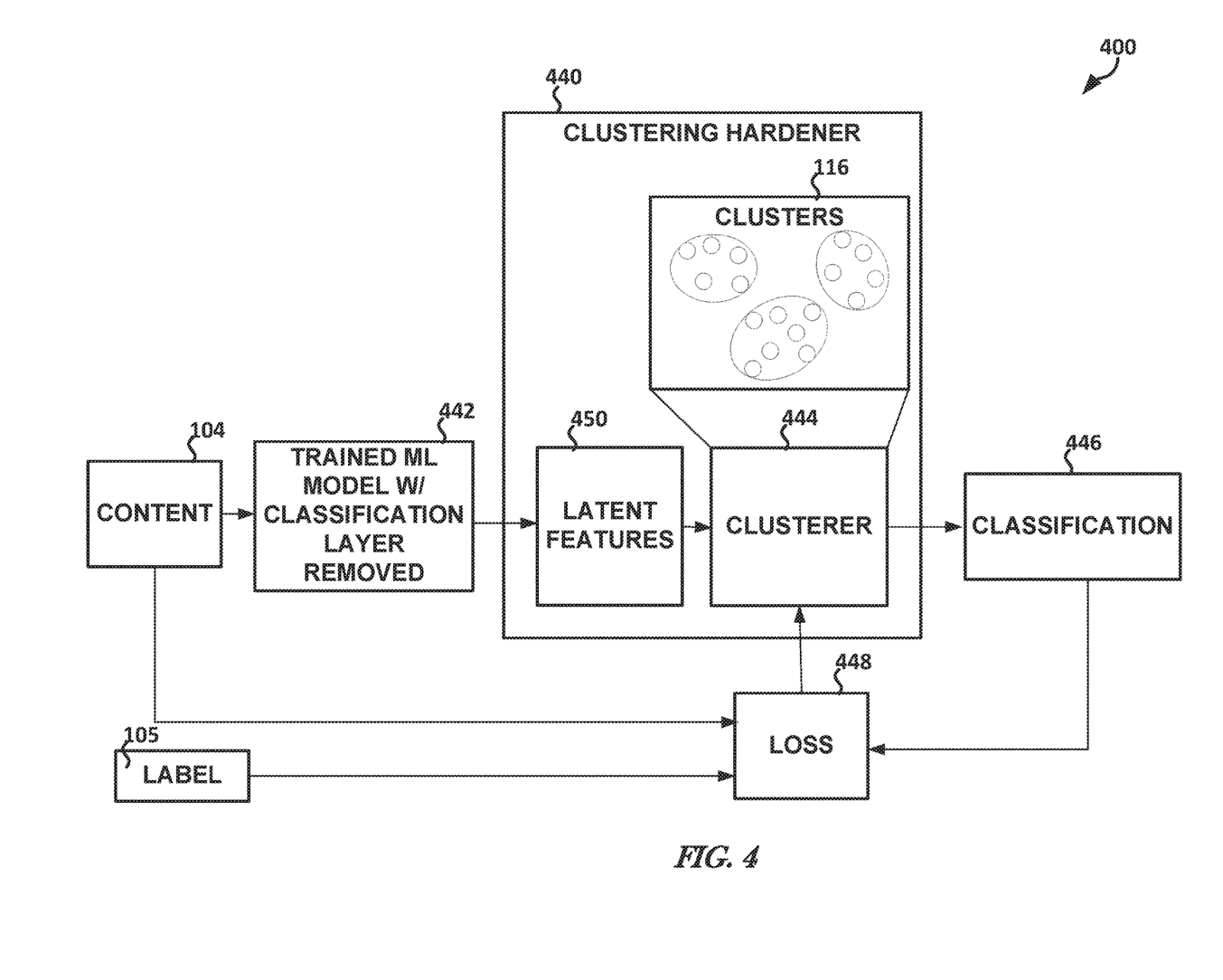
FIG. 4 illustrates, by way of example, a diagram of an embodiment of a system 400 for DNN classifier hardening.

FIG. 4 illustrates, by way of example, a diagram of an embodiment of a system 400 for DNN classifier hardening. The system 400 as illustrated includes a trained ML model 442. The trained ML model 442 can be trained with a classification layer. The classification layer typically implements a soft-max function to determine probabilities of the content 104 being in each class. To harden the trained ML model 442, such as from being overconfident, incorrect classifications, adversarial attack, outliers, or data drift, the classification layer of the trained ML model 442 can be removed. The classification layer of the trained ML model 442 can be replaced with a clustering hardener 440.

The content 104 to be classified, or to be used in training the clusterer 444, can be provided as input to the trained ML model 442. The trained ML model 442 can include a DNN or other network that generates latent feature vectors 450 that are used for classifying the content 104. In training the ML model 442, the content 104 includes a corresponding known classification indicated by the label 105. The latent features 450 are similar to the latent features 108 with the latent features 450 being determined based on the trained ML model 442 rather than the encoder 106.

The clusterer 444 receives the latent features 450. The clusterer 444 determines a classification 446 based on the latent feature vectors 450. Similar to the clusterer 118, the clusterer 444 can be trained to maximize separation between clusters 116. Different from the clusterer 118, the clusterer 444 is not trained to reduce a reconstruction loss. Thus, the clusterer 444 can be trained using a loss 448 that includes a KL-divergence, a cross-entropy loss, or the like. During runtime, the loss 448 is not used.

The clusterer 444 can determine the clusters 116 and the corresponding classification 446 in a same manner as the clusterer 118. The clusterer 444 can determine a corresponding classification 446 based on a Student's t-Distribution of the latent feature vectors 450. Confidence in the classification 446 can be determined using a distance between the latent features 450 and a central point (e.g., a centroid, a first point that formed a basis for the cluster, a point closest to the mathematical center of the cluster, or the like) of the clusters 116. Confidence can be determined as previously discussed regarding the clustering autoencoder 102.

Table 3 compares metrics of a state of the art (SOTA) DNNs with and without hardening. In Table 3, true negative rate (TNR) at a true positive rate (TPR) of 0.95, area under receiving operating characteristic (AUROC), accuracy, area under precision-recall (AUPR) curve when in-domain, and AUPR curve when out-of-domain (OOD) are compared. As can be seen from Table 3, the hardened DNN outperforms the SOTA DNN with soft-max.

TABLE 3 comparison of SOTA with soft-max classification with SOTA with cluster hardener. For Table 3, SOTA DNN is ResNet34 trained on a Canadian Institute for Advanced Research (CIFAR) 10 with street view house numbers (SVHN) OOD dataset.

| MODEL | TNR | AUROC | ACC | AUPR IN | AUPR OUT |
|---|---|---|---|---|---|
| SOFTMAX | 32.47 | 89.88 | 85.06 | 85.40 | 93.96 |
| CLUSTER HARDENER | 52.26 | 92.43 | 86.40 | 85.99 | 96.52 |

Figure 5:
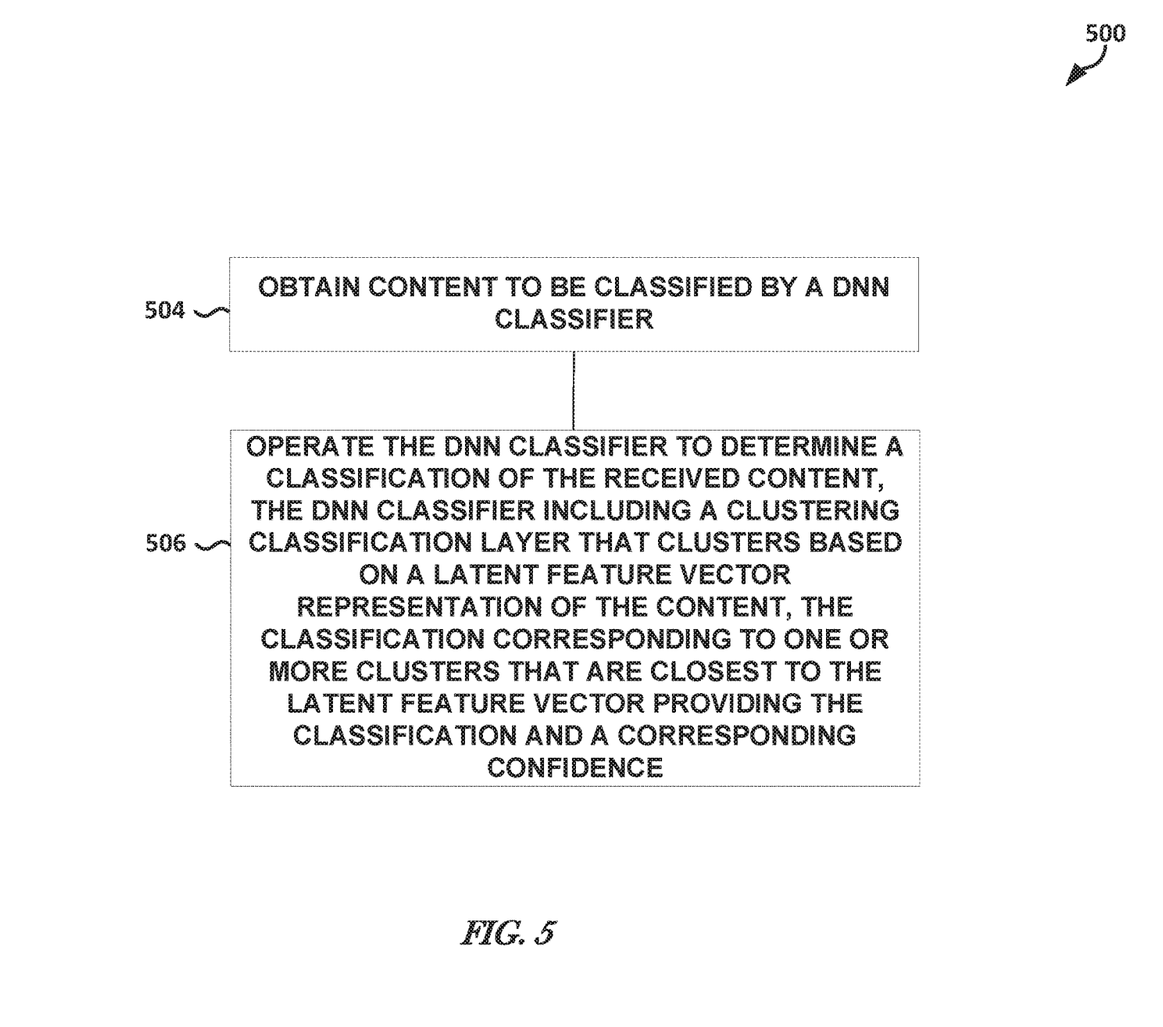
FIG. 5 illustrates, by way of example, a diagram of an embodiment of a method 500 for DNN hardening.

FIG. 5 illustrates, by way of example, a diagram of an embodiment of a computer-implemented method 500 for DNN hardening. The method 500 as illustrated includes obtaining content to be classified by the DNN classifier, at operation 502; and operating the DNN classifier to determine a classification of the received content, the DNN classifier including a clustering classification layer that clusters based on a latent feature vector representation of the content, the classification corresponding to one or more clusters that are closest to the latent feature vector providing the classification and a corresponding confidence, at operation 504.

The method 500 can further include, wherein the clustering classification layer is trained to increase a similarity between the labels and the predicted class probabilities. The method 500 can further include, wherein the clustering classification layer is trained based on a KL-divergence or a cross-entropy loss. The method 500 can further include, wherein the DNN classifier is trained using a soft-max classification layer and the clustering classification layer is used in place of the soft-max classification layer.

The method 500 can further include, wherein the clustering classification layer is trained while the DNN classifier remains static. The method 500 can further include, wherein the clustering classification layer is trained using latent feature vector representations and corresponding classifications from the DNN classifier.

The method 500 can further include, wherein the probability that the content belongs to the class is determined using a Student's t-Distribution representation of the latent feature vector representations. The method 500 can further include determining the content is an outlier in response to the distance between the latent feature representation of the content being more than a threshold distance away from a central point of each of the clusters.

Deep learning (DL) methods employ multi-layered neural networks (NNs) based on simple models of biological neurons. DL is inspired by information known about how the brain processes. DL represents the latest insights derived from neuroscience. Connections between neural units in an NN are regulated by a set of weights, which form the parameters of a DL model.

Convolutional NNs (CNNs) are a type of NN that reduce the number of model parameters that must be fit to the data by replicating a smaller set of parameters across some dimension, most often spatially or temporally. This reduction in parameters reduces the tendency of a model to over-fit to a dataset, improving the model's ability to generalize. Most, if not all, state-of-the-art methods for image, audio, and text processing now leverage CNNs. Traditional CNNs include a fully connected network layer to aggregate spatial or temporal features and provide a single output for each data instance. In contrast, all layers of a Fully Connected CNN (FCNNs) are convolutional, allowing 1) variable sized input and output and 2) multiple outputs per data instance.

DL techniques are predominantly supervised, meaning they require labeled data. The training process for these techniques seeks to take data as input and adjust the model parameters to achieve an output matching a given set of labels. Data labeling is generally time consuming and manually intensive. In contrast, autoencoders (AEs) are a family of DL techniques that traditionally used unsupervised learning to learn a low-dimensional feature representation of unlabeled data.

To achieve state-of-the-art performance, DL solutions can rely on a highly complex network of weights and functional transformations that do not lend themselves to human interpretation. The same can be true for biological neural networks, including the human brain. However, humans possess the capacity to identify reasons (felt, but albeit not provable) why two images appear similar or dissimilar in terms of specific visual patterns. It is this type of explanation which can be desired: one with which a human can resonate in order to explain why one determination occurred over another. Some have argued that you cannot have both high recognition accuracy and explainability, as the complexity of the solution to automate what a human perceptual system would achieve demands a sufficiently complex, and therefore equally opaque, solution. However, embodiments address this dilemma by allowing for sampling from a cluster in a latent feature representation space and providing the ability to construct a visible sample based on the latent feature representation.

General NN Background

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 6:
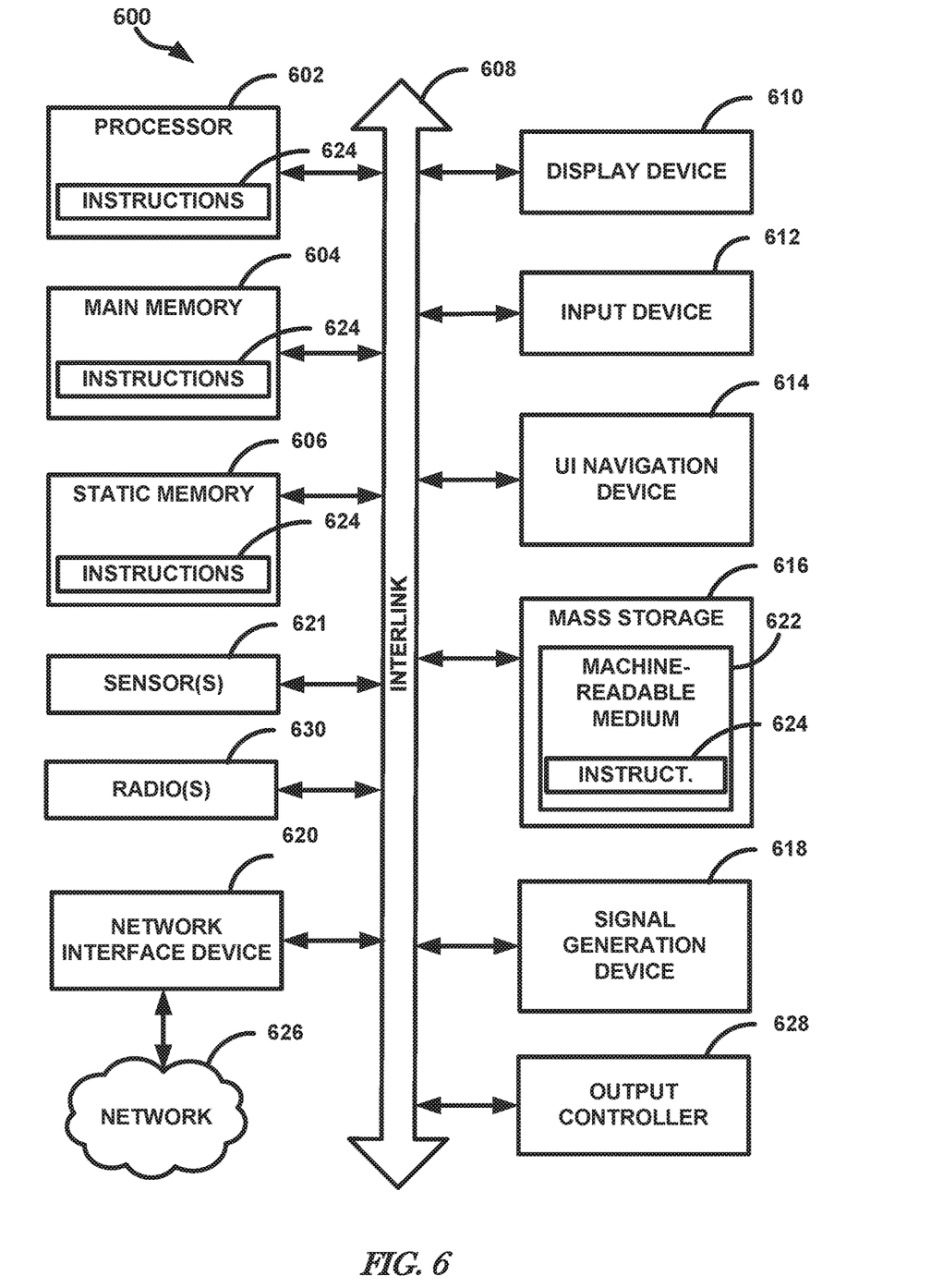
FIG. 6 illustrates, by way of example, a block diagram of an embodiment of a machine in the example form of a computer system 600 within which instructions, for causing the machine to perform any one or more of the methodologies discussed herein, may be executed.

FIG. 6 illustrates, by way of example, a block diagram of an embodiment of a machine in the example form of a computer system 600 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth, WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 can include a computer-implemented method for content classification using a deep neural network (DNN) classifier, the method comprising obtaining content to be classified by the DNN classifier, and operating the DNN classifier to determine a classification of the received content, the DNN classifier including a clustering classification layer that clusters based on a latent feature vector representation of the content, the classification corresponding to one or more clusters that are closest to the latent feature vector providing the classification and a corresponding confidence.

In Example 2, Example 1 can further include, wherein the clustering classification layer is trained to increase a similarity between the labels and the predicted class probabilities.

In Example 3, Example 2 can further include, wherein the clustering classification layer is trained based on a KL-divergence or a cross-entropy loss.

In Example 4, Example 3 can further include, wherein the DNN classifier is trained using a soft-max classification layer and the clustering classification layer is used in place of the soft-max classification layer.

In Example 5, Example 4 can further include, wherein the clustering classification layer is trained while the DNN classifier remains static.

In Example 6, Example 5 can further include, wherein the clustering classification layer is trained using latent feature vector representations and corresponding classifications from the DNN classifier.

In Example 7, at least one of Examples 1-6 can further include, wherein the probability that the content belongs to the class is determined using a Student's t-Distribution representation of the latent feature vector representations.

In Example 8, at least one of Examples 1-7 can further include determining the content is an outlier in response to the distance between the latent feature representation of the content being more than a threshold distance away from a central point of each of the clusters.

Example 9 includes a non-transitory machine-readable medium including instructions that, when executed by a machine, cause the machine to perform operations for content classification using machine learning (ML), the operations comprising obtaining content to be classified by a deep neural network (DNN) classifier, and operating the DNN classifier to determine a classification of the received content, the DNN classifier including a clustering classification layer that clusters based on a latent feature vector representation of the content, the classification corresponding to one or more clusters that are closest to the latent feature vector providing the classification and a corresponding confidence.

In Example 10, Example 9 can further include, wherein the clustering classification layer is trained to increase a similarity between the labels and the predicted class probabilities.

In Example 11, Example 10 can further include, wherein the clustering classification layer is trained based on a KL-divergence or a cross-entropy loss.

In Example 12, Example 11 can further include, wherein the DNN classifier is trained using a soft-max classification layer and the clustering classification layer is used in place of the soft-max classification layer.

In Example 13, Example 12 can further include, wherein the clustering classification layer is trained while the DNN classifier remains static.

In Example 14, Example 13 can further include, wherein the clustering classification layer is trained using latent feature vector representations and corresponding classifications from the DNN classifier.

Example 15 can include a system for machine learning (ML) model hardening, the system comprising a memory including instructions stored thereon, and processing circuitry configured to execute the instructions, the instruction, when executed by the processing circuitry cause the processing circuitry to implement a deep neural network (DNN) that receives content to be classified, and operates the DNN classifier to determine a classification of the received content, the DNN classifier including a clustering classification layer that clusters based on a latent feature vector representation of the content, the classification corresponding to one or more clusters that are closest to the latent feature vector providing the classification and a corresponding confidence.

In Example 16, Example 15 can further include, wherein the confidence that the content belongs to the class is determined using a Student's t-Distribution representation of the latent feature vector representations.

In Example 17, at least one of Examples 15-16 can further include, wherein the processing circuitry is further configured to determine the content is an outlier in response to the distance between the latent feature representation of the content being more than a threshold distance away from a central point of each of the clusters.

In Example 18, at least one of Examples 15-17 can further include, wherein the clustering classification layer is trained to increase a similarity between the labels and the predicted class probabilities.

In Example 19, Example 18 can further include, wherein the clustering classification layer is trained based on a KL-divergence or a cross-entropy loss.

In Example 20, Example 19 can further include, wherein the DNN classifier is trained using a soft-max classification layer and the clustering classification layer is used in place of the soft-max classification layer.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for content classification using a deep neural network (DNN) classifier, the method comprising:
    obtaining content to be classified by the DNN classifier, the DNN classifier including a first classification layer; and
    operating the DNN classifier to determine predicted class probabilities and corresponding confidences of the content using a second classification layer in place of the first classification layer, the second classification layer including a clustering classification layer that clusters based on a latent feature vector representation in latent feature space of the content, the confidences determined based on a distance between the latent feature vector representation and respective representative points of clusters in the latent feature space.

2. The computer-implemented method of claim 1, wherein the clustering classification layer is trained to increase a similarity between labels of respective known classifications and the predicted class probabilities.

3. The computer-implemented method of claim 2, wherein the clustering classification layer is trained based on a Kullback-Leibler (KL)-divergence or a cross-entropy loss.

4. The computer-implemented method of claim 3, wherein the DNN classifier is trained using the first classification layer, the first classification layer is a soft-max classification layer and the clustering classification layer is used in place of the soft-max classification layer.

5. The computer-implemented method of claim 4, wherein the clustering classification layer is trained while a remainder of the DNN classifier remains static.

6. The computer-implemented method of claim 1, wherein the predicted class probabilities are determined using a Student's t-Distribution representation of the latent feature vector representations.

7. The computer-implemented method of claim 1, further comprising determining the content is an outlier in response to a distance between the latent feature representation of the content being more than a threshold distance away from a central point of each of the clusters.

8. A non-transitory machine-readable medium including instructions that, when executed by a machine, cause the machine to perform operations for content classification using machine learning (ML), the operations comprising:
    obtaining content to be classified by a deep neural network (DNN) classifier, the DNN classifier including a first classification layer; and
    operating the DNN classifier to determine predicted class probabilities and corresponding confidences of the content using a second classification layer in place of the first classification layer, the second classification layer including a clustering classification layer that clusters based on a latent feature vector representation in latent feature space of the content, the confidences determined based on a distance between the latent feature vector representation and respective representative points of clusters in the latent feature space.

9. The non-transitory machine-readable medium of claim 8, wherein the clustering classification layer is trained to increase a similarity between labels of respective known classifications and the predicted class probabilities.

10. The non-transitory machine-readable medium of claim 9, wherein the clustering classification layer is trained based on a Kullback-Leibler (KL)-divergence or a cross-entropy loss.

11. The non-transitory machine-readable medium of claim 10, wherein the first classification layer includes a soft-max classification layer and the DNN classifier is trained using the soft-max classification layer and the clustering classification layer is used in place of the soft-max classification layer.

12. The non-transitory machine-readable medium of claim 11, wherein the clustering classification layer is trained while a remainder of the DNN classifier remains static.

13. A system for machine learning (ML) model hardening, the system comprising:
    a memory including instructions stored thereon;
    processing circuitry configured to execute the instructions, the instructions, when executed by the processing circuitry cause the processing circuitry to implement a deep neural network (DNN) hardener that:
        receives content to be classified by the DNN, the DNN including a first classification layer; and
        operates the DNN classifier with a second classification layer used in place of the first classification layer to determine predicted class probabilities and corresponding confidences of the received content, the second classification layer including a clustering classification layer that clusters based on a latent feature vector representation in latent feature space of the content, the confidences determined based on a distance between the latent feature vector representation and respective representative points of clusters in the latent feature space.

14. The system of claim 13, wherein the predicted class probabilities are determined using a Student's t-Distribution representation of the latent feature vector representations.

15. The system of claim 13, wherein the processing circuitry is further configured to determine the content is an outlier in response to a distance between the latent feature representation of the content being more than a threshold distance away from a central point of each of the clusters.

16. The system of claim 13, wherein the clustering classification layer is trained to increase a similarity between labels of respective known classifications and the predicted class probabilities.

17. The system of claim 16, wherein the clustering classification layer is trained based on a Kullback-Leibler (KL)-divergence or a cross-entropy loss.

18. The system of claim 17, wherein the first classification layer includes a soft-max classification layer and the DNN classifier is trained using the soft-max classification layer and the clustering classification layer is used in place of the soft-max classification layer.

* * * * *